(12) United States Patent
Inoue et al.

(10) Patent No.: US 8,710,446 B2
(45) Date of Patent: Apr. 29, 2014

(54) IMAGING APPARATUS, CONTROL METHOD THEREOF, AND PROGRAM

(75) Inventors: Hitoshi Inoue, Yokohama (JP); Hideaki Miyamoto, Tokyo (JP); Hiroyuki Omi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 711 days.

(21) Appl. No.: 12/765,108

(22) Filed: Apr. 22, 2010

(65) Prior Publication Data

US 2010/0296627 A1 Nov. 25, 2010

(30) Foreign Application Priority Data

May 21, 2009 (JP) .................... 2009-123535

(51) Int. Cl.
*G01T 1/24* (2006.01)
*G01D 18/00* (2006.01)
*G06K 9/00* (2006.01)
*G01N 23/04* (2006.01)
*H05G 1/64* (2006.01)

(52) U.S. Cl.
USPC ............ 250/370.09; 250/252.1; 250/370.11; 382/132; 378/62; 378/98; 378/207; 714/722; 702/85; 702/104

(58) Field of Classification Search
USPC ............ 250/370.09, 370.11, 252.1; 382/132; 378/62, 98–98.12, 207; 714/722; 702/85, 104

See application file for complete search history.

(56) References Cited

U.S. PATENT DOCUMENTS

| 4,178,510 | A | * | 12/1979 | Wagner ........................ 378/51 |
| 6,476,394 | B1 | * | 11/2002 | Amitani et al. ............... 250/368 |
| 2002/0165686 | A1 | * | 11/2002 | Kropfeld et al. ............ 702/104 |
| 2009/0046917 | A1 | | 2/2009 | Konishi | |

FOREIGN PATENT DOCUMENTS

| JP | 04-311171 A | 11/1992 |
| JP | 2003-284707 A | 10/2003 |
| JP | 2006-148613 A | 6/2006 |
| JP | 2007-274212 A | 10/2007 |
| JP | 2009-049527 | 3/2009 |
| WO | 2008/081165 A1 | 7/2008 |

OTHER PUBLICATIONS

The above referenced were cited in a Mar. 15, 2013 Japanese Office Action, a copy of which is enclosed without an English Translation, that issued in Japanese Patent Application No. 2009-123535.

* cited by examiner

*Primary Examiner* — Michael G Lee
*Assistant Examiner* — Laura Gudorf
(74) *Attorney, Agent, or Firm* — Cowan, Liebowitz & Latman, P.C.

(57) ABSTRACT

An imaging apparatus includes: a plurality of photoelectric converters each adapted to perform photoelectric conversion in response to receiving light, and output an electrical signal; a holding unit adapted to hold, for each of the plurality of photoelectric converters, a correction value for correcting photoelectric conversion characteristics of the photoelectric converter; and a correction unit adapted to correct each of the electrical signals output by the plurality of photoelectric converters, using the corresponding correction values, wherein the correction unit corrects each of the electrical signals based on the correction values, which have been increased or decreased in accordance with a prescribed pixel arrangement pattern, and the imaging apparatus comprises a determination unit adapted to evaluate correction results that are based on the correction values increased or decreased in accordance with the prescribed pattern, and determine a presence of a correction error in the correction values held in the holding unit.

11 Claims, 14 Drawing Sheets

F I G. 10A
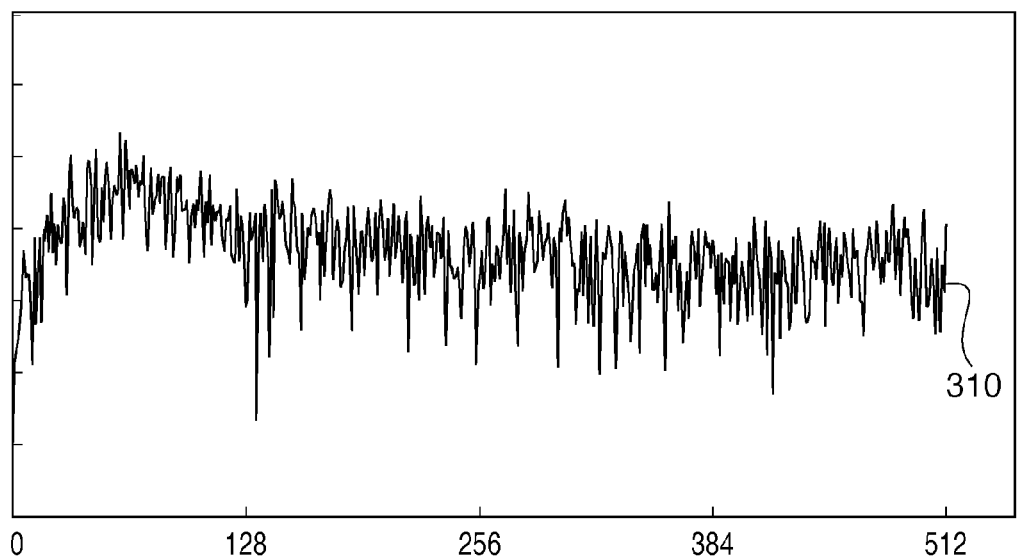
F I G. 10B
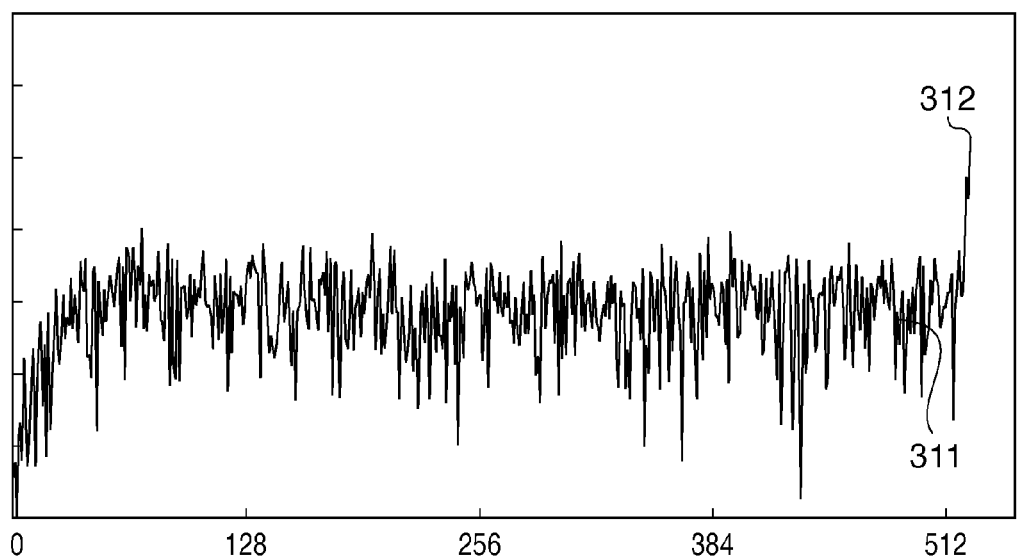

F I G. 14A
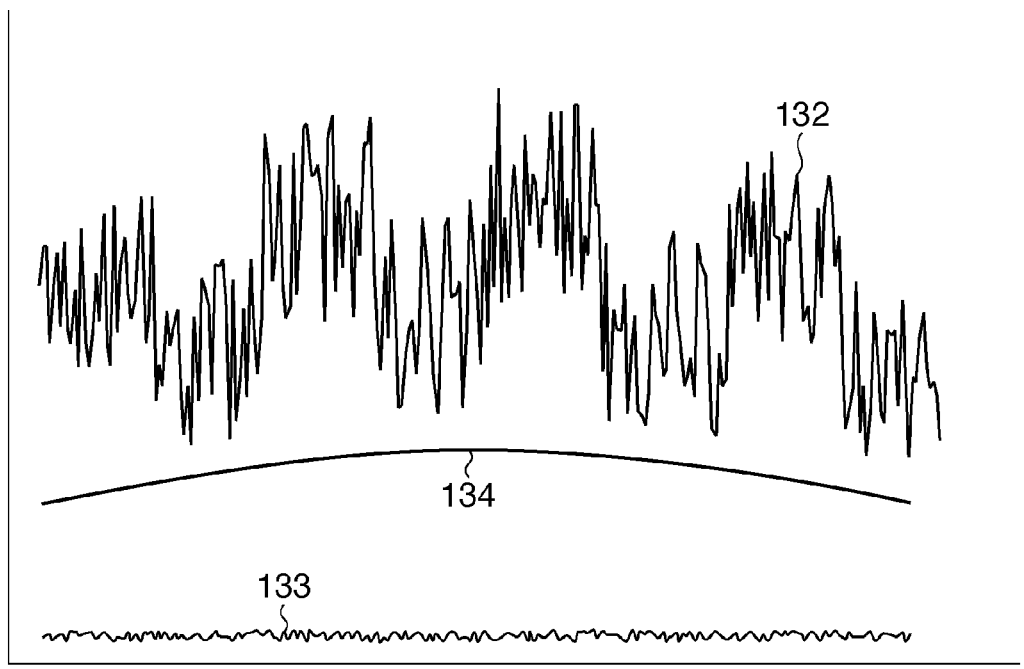
F I G. 14B
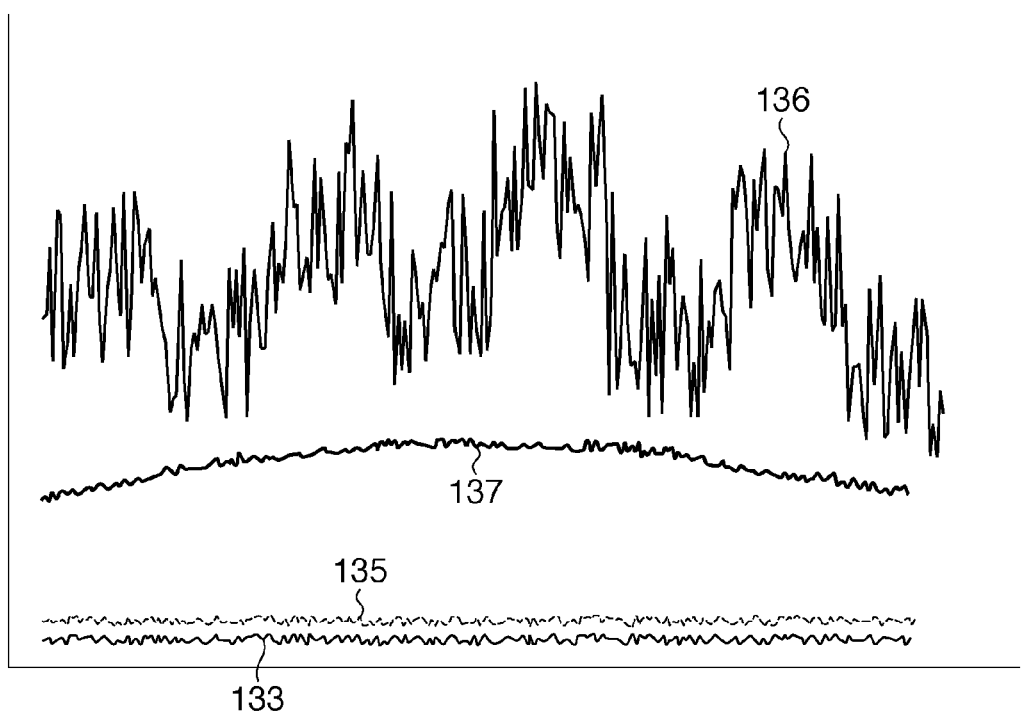

IMAGING APPARATUS, CONTROL METHOD THEREOF, AND PROGRAM

BACKGROUND OF THE INVENTION

1. Field of the Invention

The present invention relates to an imaging apparatus, a control method thereof and a program, and more particularly to an apparatus for acquiring an X-ray image and for acquiring a digital image.

2. Description of the Related Art

Technology for irradiating radiation typified by X-rays onto a substance, and measuring and imaging an intensity distribution of the radiation attenuated as a result of being transmitted through the substance has brought about the development of medical technology. Since the discovery of X-rays, a technique for imaging the intensity distribution has been adopted that involve making and developing a latent image on silver-halide film after converting the X-ray intensity distribution to visible light using phosphors. In recent years, a technique using so-called imaging plates that involves digitizing an X-ray image using photostimulable phosphors, by exciting with laser light and reading out a latent image formed as the distribution of stored energy in the photostimulable phosphors that results from X-ray irradiation has become popular. Further, large format solid-state image sensors, or so-called flat panel detectors, that can cover the whole body have been developed through advances in semiconductor technology, enabling efficient diagnosis to be carried out by digitizing X-ray images directly without making a latent image.

Meanwhile, it has also become possible to image fluorescence resulting from attenuated X-rays using a high-sensitivity image sensor typified by photomultiplier tube (image intensifier), and observe the dynamic state within the body, with this technology now in increasingly common usage. The sensitivity of recent flat panel detectors is comparable with these image intensifiers, with it now being possible to X-ray the dynamic state over a wide range of regions of the body.

A flat panel detector converts the intensity distribution of X-rays that have passed through an object into the light intensity distribution of a scintillator or a two-dimensional distribution of electron density resulting from free electron excitation of semiconductors. In order to extract image information as a one-dimensional electrical signal, sequential scanning is performed using a transistor called a TFT (Thin Film Transistor) that is implemented by being printed in high density in a two-dimensional planar state using semiconductor manufacturing technology.

Principles of Flat Panel Detectors

FIG. 11 shows an example of a typical configuration of a flat panel detector for converting the light intensity distribution of a scintillator into an electrical signal. In the example in FIG. 11, the flat panel detector is constituted by adhering a scintillator 201 and a planar image sensor 202 or by directly depositing the scintillator onto the image sensor. When X-rays having a spatial intensity distribution reach the flat panel detector from the direction of the arrow in FIG. 11, the scintillator emits light in accordance with the X-ray intensity distribution, and image information is extracted as an electrical signal by the image sensor.

FIG. 12 represents the internal configuration and peripheral circuitry of the common image sensor 202, and FIG. 13 schematically shows the configuration of a conventional X-ray imaging apparatus that incorporates the image sensor 202.

In FIG. 12, the block enclosed by a broken line 101 is a single pixel. The pixel 101 has a photodiode 102 and a TFT 103, which is a field-effect transistor. Normally, these pixels are arranged grid-like in a planar state at an interval of around 0.1 to 0.2 mm. The TFT has a gate signal line 108 and a source signal line 109 similarly to a normal field-effect transistor.

The gate signal line 108 arranged on a two-dimensional plane is connected to another gate signal line in the latitudinal direction, and to a single output of a shift register 104 (111), as shown in FIG. 12. Switching control of the transistor gate is thereby performed. A similar connection is applied to all gate signal lines of the pixels aligned in the latitudinal direction, and the gate signal lines are connected to the output of the shift register 104. Control of the shift register 104 is performed by a row selection control unit 142 as shown in FIG. 13. Specifically, gate signals are sequentially selected in the shift register 104, as a result of a clock pulse input (105) to the shift register 104.

On the other hand, the source signal lines, which are the output of the TFTs, are all connected in the longitudinal direction such as shown in FIG. 12, and signals are input to a multiplexer 106 via sample and hold circuits (S/H circuits) 113. Hereinafter, the S/H circuits 113 and the multiplexer 106 will be collectively called a sample/hold-multiplexer circuit (S/H-MPX) 110.

This connection is applied to all source signal lines of the TFTs of pixels arranged in the longitudinal direction. Control of the sample/hold-multiplexer circuit 110 is performed by a column selection control unit 141 such as shown in FIG. 13. Specifically, control for sequentially selecting input signals in the multiplexer 106 after the signals have been sampled and held in the S/H circuits 113 is performed. The output of the multiplexer 106 is then sequentially input to an amplifier (AMP) 152, as shown in FIG. 13.

Planar scanning is completed by repeating the row selection control and the column selection control. The output of the amplifier 152 is input to an analog-to-digital converter 121 in order to be converted to digital values as image information, and a digital value sequence serving as an image signal is output.

The system, enclosed by a broken line 120 in FIG. 13, from input of the X-ray intensity distribution to output of the digital value sequence as image information is called an X-ray imaging system. The image sensor 202 used here is manufactured using semiconductor manufacturing technology, with difficulties being encountered in uniformly manufacturing the photoelectric conversion characteristics or capacitance characteristics of the pixels 101. For this reason, the respective characteristics of individual pixels generally differ. Also, difficulties are additionally encountered in ensuring the uniform accuracy of capacitances in the sample and holds and the uniform accuracy of the plurality of amplifiers that exist. Consequently, the electrical signals thus obtained contain the conversion characteristics of conversion from the X-ray intensity per pixel to the digital value sequence serving as an image signal, and cannot be directly handled as image information representing the X-ray intensity distribution.

Offset Correction

Generally, image information that is proportionate to X-ray intensity is acquired by correcting the conversion characteristics of each pixel in the X-ray imaging system, based on image signals containing the characteristics of each pixel. The principles of this image signal correction (offset correction) will therefore be outlined.

For example, when the X-ray intensity incident on a given pixel is defined as X, and the corresponding electrical signal output is defined as Y, the relation between X and Y can be represented with the following equation (1):

$$Y = aX + b \quad (1)$$

Here, a is a coefficient representing the proportional relation between X-ray intensity and output, and is called a gain coefficient. Also, b is the signal level originally added to the signal, and is called an offset coefficient. Image signals need to be corrected because the gain coefficient (a) and the offset coefficient (b) differ for each pixel.

To correct the characteristics of each pixel, the above a and b are measured separately, and held as a gain correction value A and an offset correction value B. A signal equivalent to X is obtained by performing an inverse conversion of equation (1) using the gain correction value A and the offset correction value B. Note that the gain coefficient corresponds to the gain correction value, and that the offset coefficient corresponds to the offset correction value.

The offset correction value B can be derived by acquiring an image signal in a state where X-ray irradiation is not performed (X=0), and taking this image signal as B. Further, the gain correction value A can be calculated by performing X-ray irradiation at an intensity corresponding to X=1 uniformly over the flat panel detector to obtain an image signal, and subtracting B therefrom.

The X-ray intensity X can be corrected by performing an arithmetic operation such as equation (2) on the measured electrical signal output using A and B. That is, this can be represented with the following equation (2), by substituting the output image information.

$$X = (Y - B)/A \quad (2)$$

FIG. 13 shows a common configuration for performing the above correction.

In FIG. 13, a block 122 is an offset correction value holding memory that stores offset correction values for all pixels. A block 123 is an offset correction unit that corrects offset by subtracting the offset correction values from image signals including the object that are normally output.

A block 124 is a gain correction value holding memory that holds gain correction values resulting from offset correction performed based on signals obtained by performing uniform X-ray irradiation. A gain correction unit 125 uses offset corrected signals output from the correction unit 123 to perform a division operation or a subtraction operation after performing log-transformation, thereby acquiring image information with respect to which the characteristics of each pixel of the sensor have been corrected.

A block 127 is a defective pixel value correction unit that corrects the pixel values of pixels in the image sensor that are not functioning (defective pixels). The defective pixel value correction unit 127 normally estimates and corrects defective pixel values using an averaging operation or the like based on the pixel values of neighboring non-defective pixels. The position of defective pixels is ascertained beforehand, and recorded for use by a defective pixel position holding memory 126. In FIG. 13, output resulting from the correction process is obtained with a signal 128 as a result, and a corrected image 129 is acquired.

FIGS. 14A and 14B show example changes in signal before and after correction, with FIG. 14A showing an example change in signal before and after correction in an ideal environment. In FIG. 14A, the horizontal axis represents the row position of the output image 129, and the vertical axis represents the pixel value. In FIG. 14A, a graph 132 shows pixel values before the correction process is performed, and is equivalent to data on a signal line 131 in FIG. 13.

A graph 133 in FIG. 14A shows offset correction values of the line 131 that are held in the offset correction value holding memory 122 in FIG. 13. A graph 134 plots the signals 128 of the rows in FIG. 13 on which sensor characteristic correction has been performed. The result represents the fact that an output image with smooth signal information is obtained by performing a sensor characteristic correction process for precisely representing the X-ray intensity distribution of input, despite the signal 132 fluctuating greatly under the influence of the sensor characteristics.

Note that in terms of configurations for detecting defective pixels, a configuration that performs defective pixel correction using whichever of vertical addition or horizontal addition results in an increase in the number of effective pixels is known (see Japanese Patent Laid-Open No. 2009-049527).

The offset coefficient and the gain coefficient, being strongly dependent on the semiconductor characteristics, typically change under the influence of environmental change (temperature, humidity) and degradation over time. Naturally, the sensor characteristic correction process will not be performed normally, in the case where the offset correction value or gain correction value held beforehand differ from the offset coefficient or gain coefficient when X-ray imaging is actually performed. For this reason, variations in sensor characteristics per pixel remain in the output image.

Normally, it is necessary to regularly acquire and correct the offset correction values or gain correction values, and rewrite the content of the offset correction value holding memory 122 or the gain correction value holding memory 124 as provision for this change. This processing is called calibration.

FIG. 14B shows an example change in signal before and after correction in the case where the offset coefficient of the actual sensor output changes under the influence of temperature fluctuation or the like. A graph 135 shows the change in the actual offset coefficient of the sensor output; that is, the result of performing sensor characteristic correction using the existing offset correction value 133 recorded in the offset correction value holding memory 122. A graph 136 plots the pixel values before the correction process is performed, and represents the data on the signal line 131 in FIG. 13. A graph 137 is the result of performing the correction process. As shown by the graph 137, in an environment in which the influence of environmental change, degradation over time or the like exists, a smooth result will not obtained without correction being appropriately performed.

This phenomenon will now be described. An output Y' obtained after a change in temperature is represented as follows, focusing on a single given pixel, where b' is the offset coefficient resulting from temperature change:

$$Y' = aX + b' \quad (3)$$

When Y' is corrected with the offset correction value B, an output X' obtained after correction is represented by the following equation:

$$\begin{aligned} X' &= (Y' - B)/A \quad (4) \\ &= (AX + b' - B)/A \\ \therefore X' &= X + (b' - B)/A \end{aligned}$$

Here, since b'≠B due to temperature fluctuation, the value of the calculated signal X' will differ from the originally intended X, with the second component ((b'−B)/A) remaining. Hereinafter, this component will be called a correction error. Although its appearance is unpredictable, the correction error often manifests in the display image as a fixed pattern originating in the manufacturing process or configuration of flat panel detectors.

With a conventional configuration, recalibration that involves reacquiring offset correction values and gain correction values must be performed after this correction error has manifested as an unpredictable fixed pattern on the image, at the stage at which the image observer feels that something is not quite right. That is, in order to determine the presence of a correction error and judge whether calibration needs to be performed, the observer needed to judge images not originally part of the object through observation. Here, it is difficult to recover an image once a correction error has manifested itself.

SUMMARY OF THE INVENTION

The present invention has been made in consideration of the above problems, and aims to provide technology for automatically determining whether the conversion characteristics of pixels in an imaging system need correction, without requiring manual observation.

According to one aspect of the present invention, an imaging apparatus includes:

a plurality of photoelectric converters each adapted to perform photoelectric conversion in response to receiving light, and output an electrical signal;

a holding unit adapted to hold, for each of the plurality of photoelectric converters, a correction value for correcting photoelectric conversion characteristics of the photoelectric converter; and a correction unit adapted to correct each of the electrical signals output by the plurality of photoelectric converters, using the corresponding correction values, wherein the correction unit corrects each of the electrical signals based on the correction values, which have been increased or decreased in accordance with a prescribed pixel arrangement pattern, and the imaging apparatus comprises a determination unit adapted to evaluate correction results that are based on the correction values increased or decreased in accordance with the prescribed pattern, and determine a presence of a correction error in the correction values held in the holding unit.

According to another aspect of the present invention, an imaging apparatus includes:

a plurality of photoelectric converters each adapted to perform photoelectric conversion in response to receiving light, and output an electrical signal;

a holding unit adapted to hold, for each of the plurality of photoelectric converters, a correction value for correcting photoelectric conversion characteristics of the photoelectric converter; and a correction unit adapted to correct each of the electrical signals output by the plurality of photoelectric converters, using the corresponding correction values, wherein the photoelectric converters each have first photoelectric conversion characteristics or second photoelectric conversion characteristics, and are arranged in accordance with a prescribed pattern, and the imaging apparatus comprises a determination unit adapted to evaluate a correction result of the electrical signals output by the photoelectric converters, and determine a presence of an error in the photoelectric conversion characteristics of the photoelectric converters.

According to still another aspect of the present invention, a control method of an imaging apparatus that includes a plurality of photoelectric converters each adapted to perform photoelectric conversion in response to receiving light, and output an electrical signal, and a holding unit adapted to hold, for each of the plurality of photoelectric converters, a correction value for correcting photoelectric conversion characteristics of the photoelectric converter, includes:

a correction step of correcting each of the electrical signals output by the plurality of photoelectric converters, using the corresponding correction values, wherein in the correction step, each of the electrical signals is corrected based on the correction values, which have been increased or decreased in accordance with a prescribed pixel arrangement pattern, and the control method comprises a determination step of evaluating correction results that are based on the correction values increased or decreased in accordance with the prescribed pattern, and determining a presence of a correction error in the correction values held in the holding unit.

Further features of the present invention will become apparent from the following description of exemplary embodiments (with reference to the attached drawings).

BRIEF DESCRIPTION OF THE DRAWINGS

FIGS. 10A and 10B show example power spectra of line information.

FIGS. 14A and 14B show example power spectra of line information.

DESCRIPTION OF THE EMBODIMENTS

Hereinafter, embodiments according to the present invention will be described in detail with reference to the accompanying drawings. Constituent elements described in these embodiments are merely by way of example, and are not intended to limit the scope of the invention. Also, not all combinations of the features described in the embodiments are essential to the invention.

X-ray Imaging Apparatus

Figure 1:
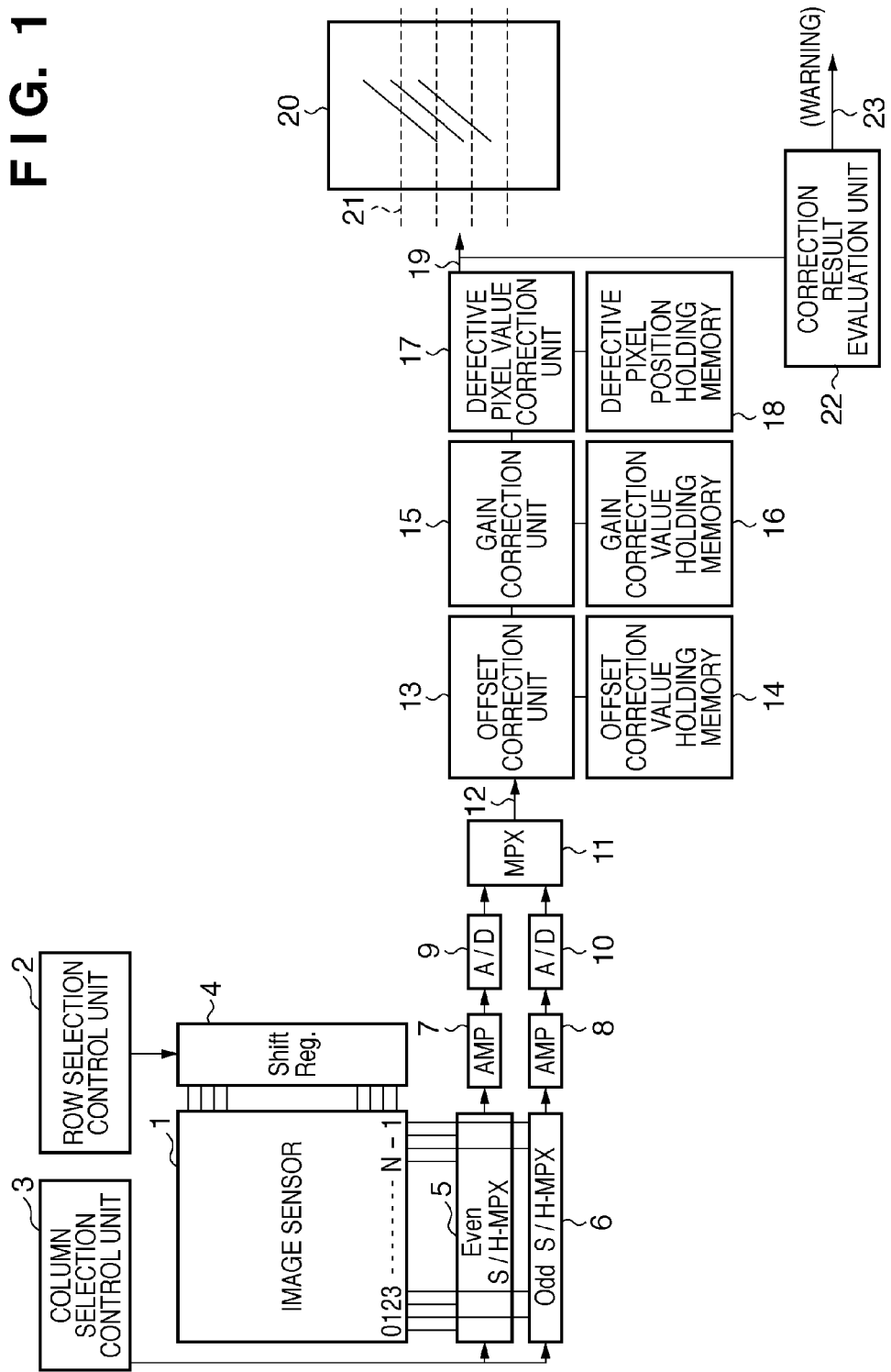
FIG. 1 is a block diagram showing an example configuration of an X-ray imaging apparatus.

FIG. 1 is a block diagram of an X-ray imaging apparatus (imaging apparatus) in the present embodiment. Reference numeral 1 denotes an image sensor portion of an X-ray flat panel detector, the image sensor having a plurality of photoelectric converters that perform photoelectric conversion in response to receiving light, and output electrical signals. As discussed below, in the present embodiment, the plurality of photoelectric converters are arranged in a matrix. Reference numeral 2 denotes a row selection control unit that generates a pulse signal for driving the image sensor. The pulse signal generated by the row selection control unit 2 is input to a shift register 4, and selection of rows in the image sensor is performed by the output signal of the shift register 4.

Pixel signals of the columns in the row selected by the output of the shift register 4 are input in parallel to both a sample/hold-multiplexer (S/H-MPX) 5 for handing the pixels of even-numbered rows and a sample/hold-multiplexer 6 for handing the pixels of odd-numbered rows. Timing control of the sample-and-hold operation performed by the S/H-MPXs 5 and 6 and selection control of signals output by the multiplexers is performed by a column selection control unit 3. Signals sequentially output by the multiplexers of the S/H-MPXs 5 and 6 are input to analog-to-digital converters 9 and 10 and respectively converted to digital values, after the signal levels and signal widths thereof have been adjusted by amplifiers 7 and 8. This digital data of the even and odd-numbered rows is input to a digital multiplexer 11 and output as a continuous time series, in order to allow sequential correction processing to be performed with a single signal processing circuit.

A block 14 is an offset correction value holding memory that holds offset correction values for correcting offset characteristics of photoelectric conversion characteristics. The offset correction value holding memory 14 holds image information acquired beforehand in a state where X-rays are not irradiated. In an offset correction unit 13, offset correction is performed by reading out the offset correction value of a corresponding position from the offset correction value holding memory 14, and subtracting the read offset correction value from information corresponding to image information X-rayed in the image sensor 1.

The information that has undergone offset correction undergoes gain correction in a gain correction unit 15 to correct for variations in gain between pixels. Gain correction values for correcting gain characteristics of photoelectric conversion characteristics are held in a gain coefficient holding memory (gain correction value holding memory) 16. The gain correction value holding memory 16 holds correction values representing gain variations (gain correction values) obtained by numerically converting image information acquired as a result of performing offset correction on an image of X-rays irradiated at a uniform intensity in a state where there is no object (uniform X-ray intensity distribution). X-rays physically contain random noise. For this reason, these gain correction values generally reduce the influence of random noise as a result of being acquired from information obtained by performing an averaging operation on a plurality of uniform X-ray intensity distributions.

A block 17 is a defective pixel value correction unit that corrects the pixel values of pixels in the image sensor that are not functioning (defective pixels). The defective pixel value correction unit 17 normally performs correction by estimating the defective pixel value from pixel values obtained from neighboring non-defective pixels using an averaging operation or the like. The position of defective pixels is ascertained beforehand and recorded by a defective pixel position holding memory 18, and the defective pixel positions are appropriately read out and used in correction by the defective pixel value correction unit 17. The corrected image that is ultimately output is obtained on a signal line 19.

Thus, in the present embodiment, correction values for correcting these photoelectric conversion characteristics are held in the offset correction value holding memory 14, the gain correction value holding memory 16, and the defective pixel position holding memory 18, for each of the plurality of photoelectric converters. The offset correction unit 13, the gain correction unit 15 and the defective pixel value correction unit 17 perform correction using correction values corresponding to each of the electrical signals output by the photoelectric converters. Here, in the present embodiment, each of the electrical signals is corrected based on correction values that have been increased or decreased in accordance with a prescribed pixel arrangement pattern, and the presence of a correction error in the correction values held in advance is determined by evaluating the correction results that are based on these increased or decreased correction values. The presence of a correction error can thus be determined automatically without requiring manual observation.

Reference numeral 20 schematically denotes output image information, and row information indicated with the plurality of broken lines of reference numeral 21 is extracted, and the presence of a correction error is examined. Reference numeral 22 is a correction result evaluation unit that examines the presence of a correction error. The correction result evaluation unit 22 outputs a warning indicating that there is a correction error to a display unit (not shown), for example, via a signal line 23, in the case where the result of evaluating the correction results indicates that correction was not performed normally. Note that various types of operations, which will be discussed below, can be executed by a CPU (Central Processing Unit (not shown)) executing programs stored on a computer-readable recording medium such as a ROM (Read Only Memory) or the like.

Operation Outline

Here, the gain coefficients of the amplifier 8 corresponding to the pixels of the odd-numbered rows and the gain coefficients of the amplifier 7 corresponding to the pixels of the even-numbered rows are intentionally differentiated. When the analog output value of the image sensor is given as V, and the digital output value obtained with reference numeral 12 is given as Y:

$$Y = c \cdot V + d \quad (5)$$

Here, c is the gain obtained by summing the gains of the amplifiers attached to the sample and holds or the downstream amplifiers, and d is the offset of similar amplifiers. Normally, at the stage at which calibration is performed, c and d are precisely measured, and held as a gain correction value C and an offset correction value D.

A digital output value Y' in the case where an offset d has changed to d' due to the influence of temperature fluctuation or the like will be as follows.

$$Y' = c \cdot V + d' \quad (6)$$

An image sensor output value V' obtained in the case where Y' is corrected with correction values b and A will be:

$$V' = V + (d' - D)/C \quad (7)$$

with the gain correction value C and d' remaining.

Here, when a gain Co of the amplifier of the odd-numbered rows and a gain Ce of the amplifier of the even-numbered rows are intentionally differentiated, a pattern alternating between strong and weak intensity appears in X', according to the gains Ce and Co per pixel.

Figure 8:
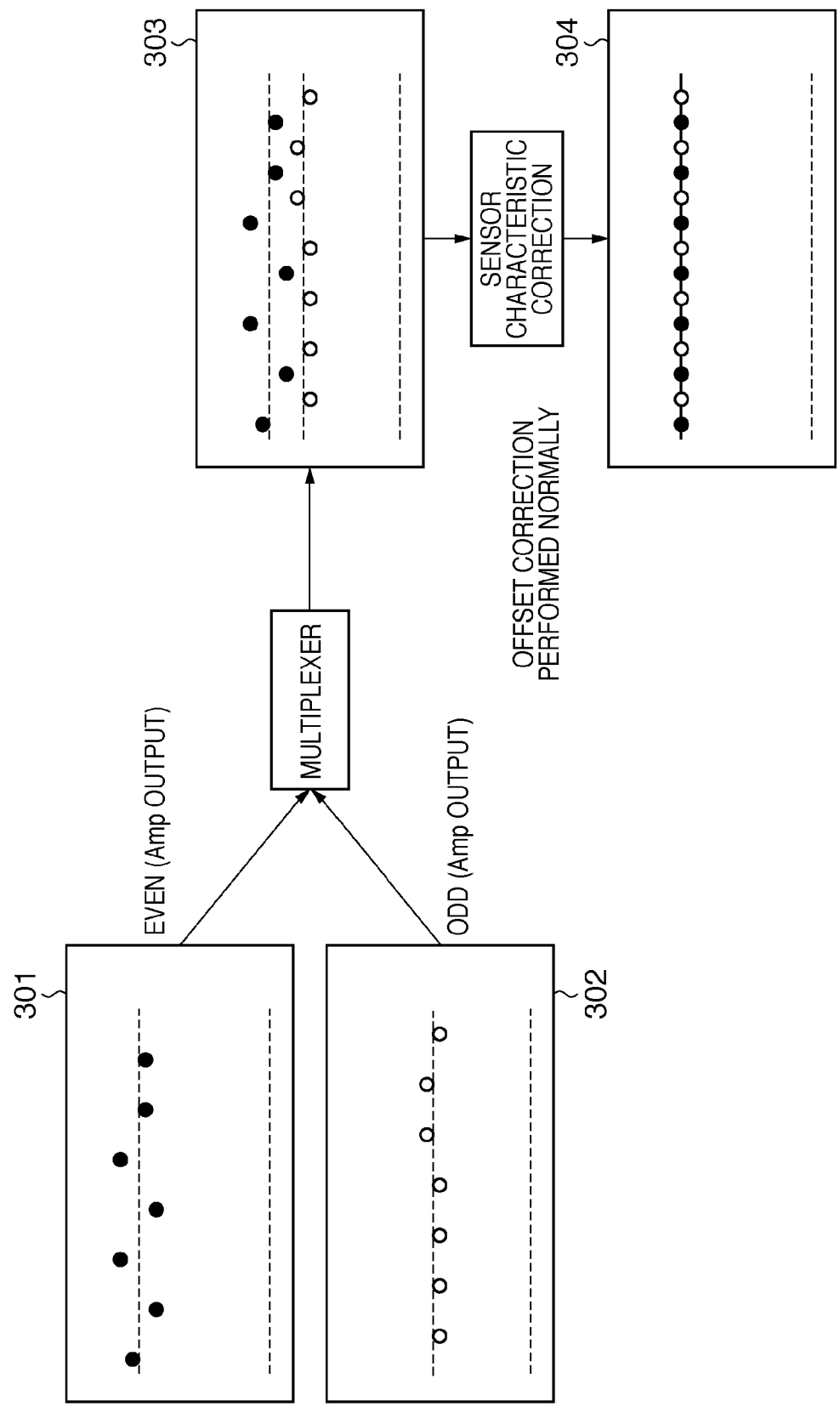
FIG. 8 is a schematic view showing an example result of correction performed normally.
Figure 9:
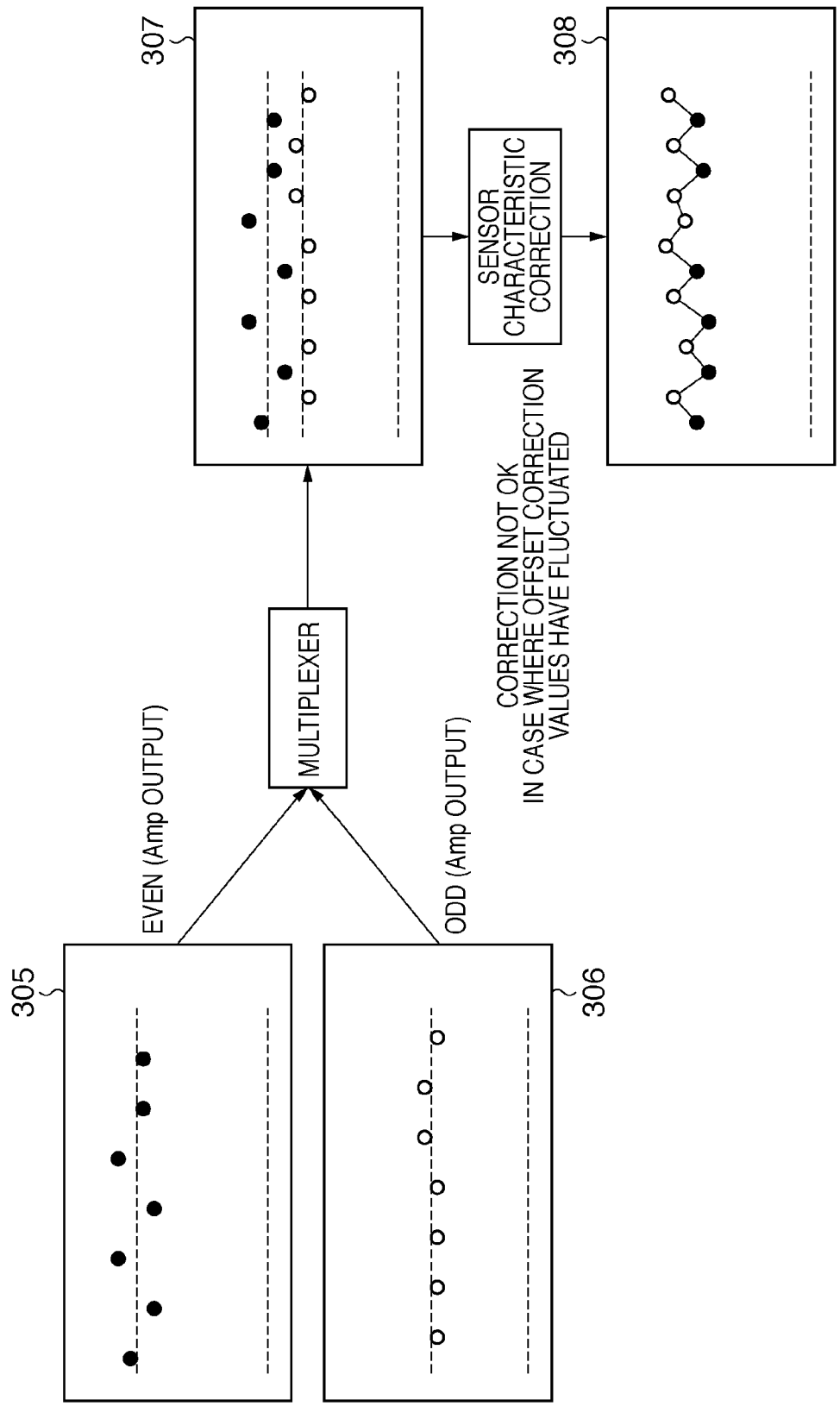
FIG. 9 is a schematic view showing an example result when a correction error exists.
Figure 11:
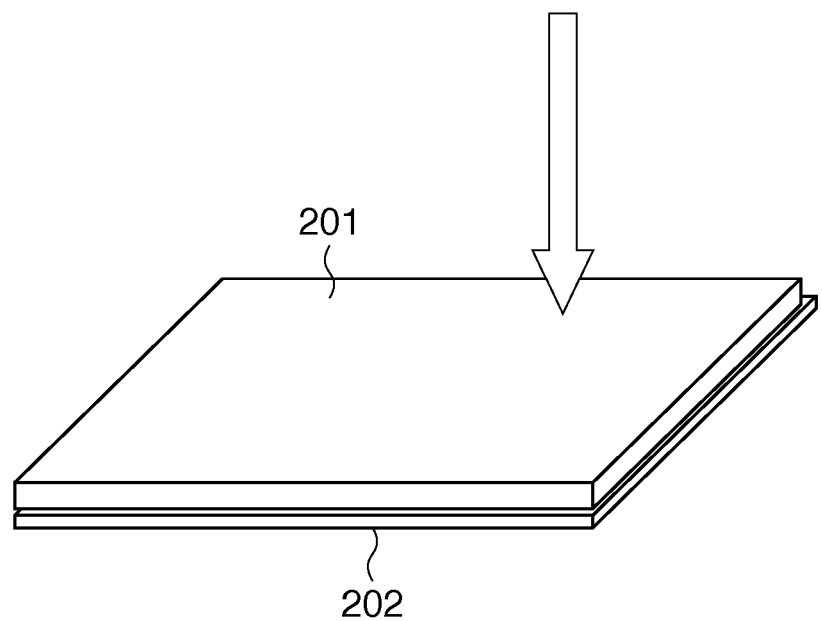
FIG. 11 is a schematic view showing an example configuration of an X-ray flat panel detector.
Figure 12:
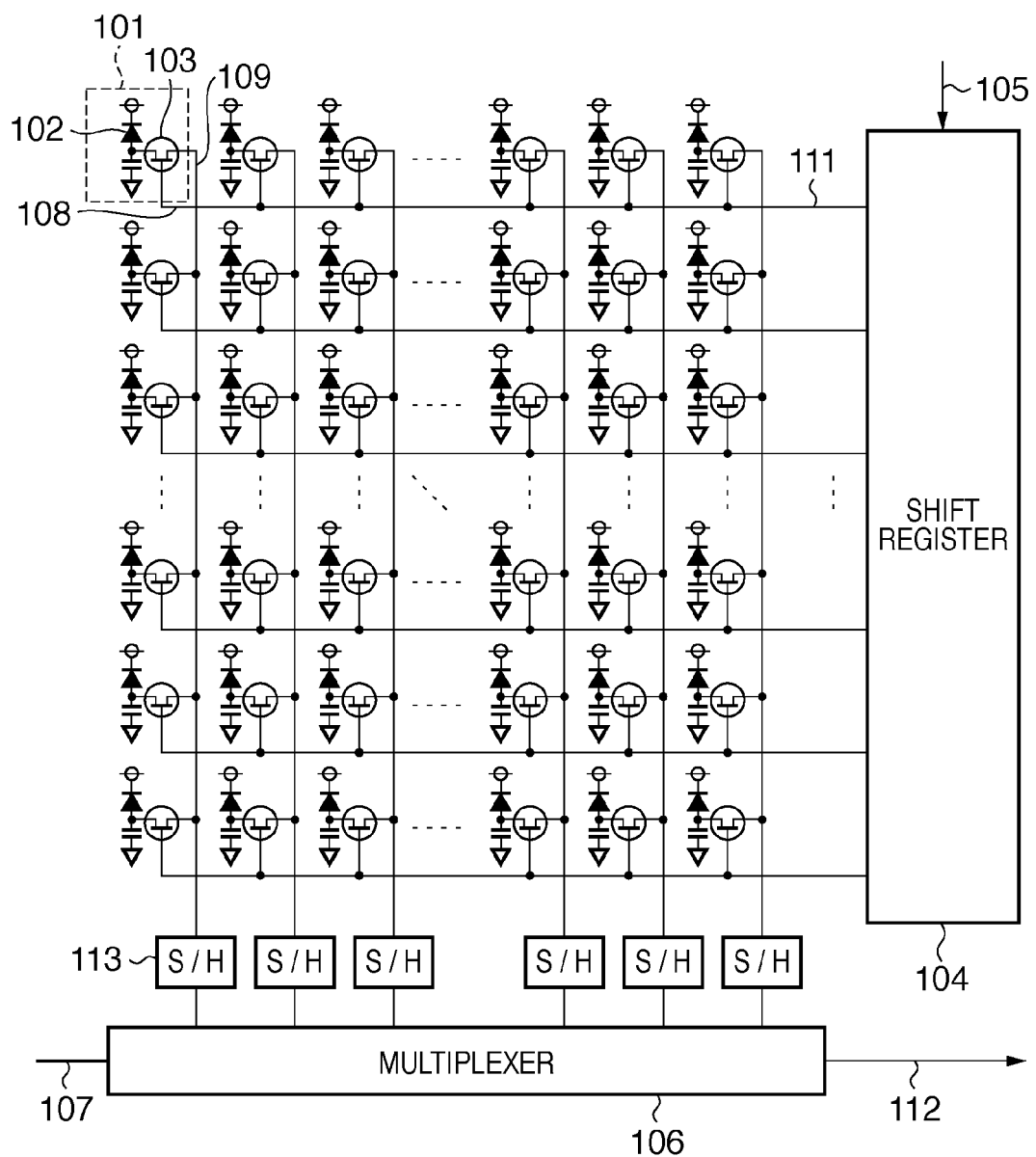
FIG. 12 is a schematic view showing an example internal structure of an image sensor.
Figure 13:
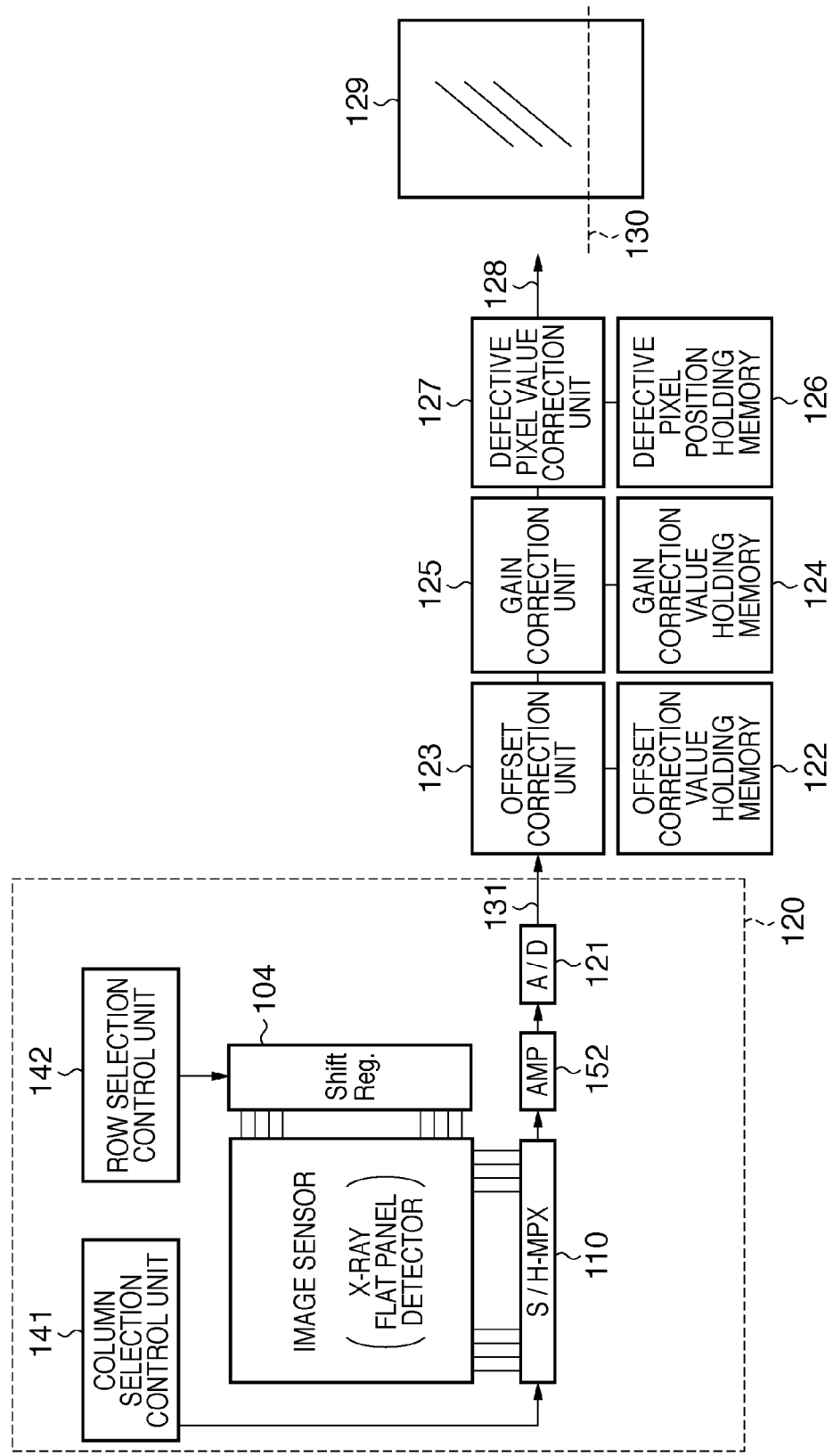
FIG. 13 is a block diagram showing an example configuration of an X-ray imaging apparatus.

FIGS. 8 and 9 schematically show this phenomenon, with it being assumed in both figures that X-rays of fixed value are incident on the image sensor. FIG. 8 shows the case where sensor characteristic correction is carried out normally without offset fluctuating. In FIG. 8, reference numeral 301 denotes the output of the amplifier of the even-numbered rows, reference numeral 302 denotes the output of the amplifier of the odd-numbered rows, and reference numeral 303 denotes output that has been multiplexed and reordered. Reference numeral 304 denotes the result of performing the correction process, with the gain variations of the amplifiers having been corrected.

FIG. 9 shows the case where there is offset fluctuation, with reference numeral 305 denoting the output of the amplifier of the even-numbered rows, reference numeral 306 denoting the output of the amplifier of the odd-numbered rows, and reference numeral 307 denoting output that has been multiplexed and reordered. Reference numeral 308 denotes the result of performing the correction process, with the values of the odd-numbered rows and the even-numbered rows alternating between strong and weak intensity since there is a correction error.

Such a pattern is difficult to perceive with the human eye when displayed, since the inter-pixel gap is very small at 0.1 to 0.2 mm, but if, for example, a Fourier transform is performed on the image information, this pattern can be detected as information not normally present in the object (a pattern clearly alternating between strong and weak intensity every pixel).

Thus, in the case where the offset d' that has changed due to temperature fluctuation or the like does not match the offset correction value D held in advance in the offset correction value holding memory 14, the (d'−D)/C component also fluctuates in response when the gain C of the amplifiers fluctuates. For this reason, the (apparent) image sensor output value V' also fluctuates according to the gain C. On the other hand, in the case where the offset d' matches the offset correction value D, the (d'−D)/C component will be 0, so the (apparent) image sensor output value V' does not fluctuates even if the gain C is changed. Consequently, when the image sensor output value V' changes in accordance therewith when the gain C fluctuates, the offset correction value D can be determined not to be correct because of not matching the offset d'. On the other hand, when the image sensor output value V' has not changed, the offset correction value D can be determined to be correct.

Correction Result Evaluation Unit

Figure 2:
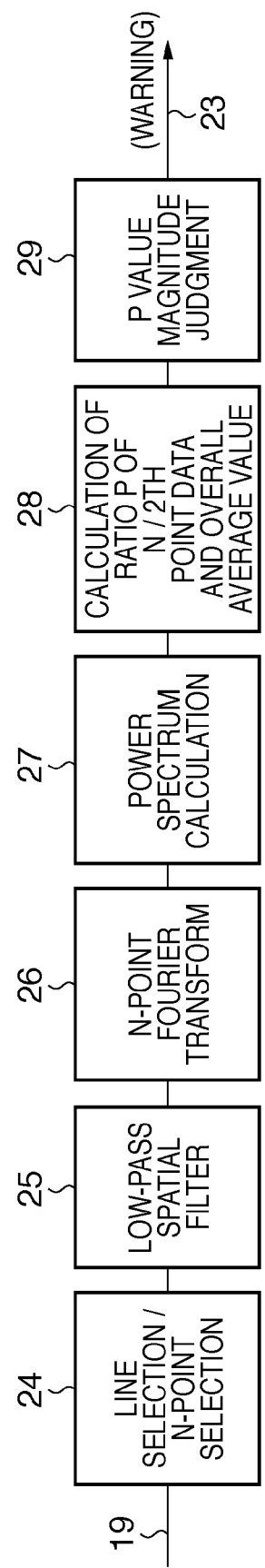
FIG. 2 is a block diagram showing an example configuration of a correction result evaluation unit.

FIG. 2 shows an example of the correction result evaluation unit 22 in FIG. 1, which inputs signals via the signal line 19 in FIG. 1, and performs output via the signal line 23. Reference numeral 24 denotes a processing unit that selects a specific line in the image and extracts consecutive N points therein. Reference numeral 25 denotes a spatial frequency low-pass filter for removing trend components and the like for when a Fourier transform is performed downstream, and preventing the occurrence of numerical time-series truncation errors when the Fourier transform is performed. The low-pass filter 25 can, for example, be configured using a Laplacian filter or the like.

Reference numeral 26 denotes an N-point Fourier transform. In the case where the Fourier transform is executed using an FFT (Fast Fourier transform), N will be a power of two. Reference numeral 27 denotes a block that performs a power spectrum calculation based on the Fourier transform output, and specifically finds the sum of squares of the real part and the imaginary part. If there is a pattern alternating between strong and weak intensity every pixel in the row, the data of N/2th point of the power spectrum near the Nyquist frequency will show a significant peak compared with the power spectra of other frequencies.

FIGS. 10A and 10B show example power spectra in the case where N=1024. Reference numeral 310 in FIG. 10A denotes a power spectrum series in the case where correction is performed normally, and reference numeral 311 in FIG. 10B denotes a power spectrum series in the case where there is a correction error. As shown in FIG. 10B, a prominent peak 312 exists in the power spectrum series 311. Detection of this peak can be performed based on a ratio of the power spectrum of the N/2th (512th) point to the power spectra of other portions, for example. A block 28 in FIG. 2 performs this arithmetic operation, with a value P being output as the ratio. Reference numeral 29 denotes a block that judges the magnitude of the P value, with a warning being output if the P value is at or above a defined value. Thus, if there is determined to be a correction error, the operator is able to find out by being notified of this fact. When a warning indicating the existence of a correction error is output, the operator calibrates the apparatus using a known method.

Thus, in the present embodiment, automatic determination of the presence of a correction error can be readily realized, by using the peak value of the result of performing a Fourier transform, for instance, because of using a pattern repeatedly alternating between increasing and decreasing correction values for each adjacent row of the matrix. Further, evaluation of the presence of a correction error is not limited to using a Fourier transform.

As an alternative technique for performing this evaluation, the average value of all pixel values in odd-numbered rows and the average value of all pixel values in even-numbered rows may both compared, and if the difference of these two average values is at or above a defined value, there may be judged to be a correction error. This technique makes use of the fact that adjacent pixel values in an image are substantially equal. That is, this method makes use of the fact that if there is not a correction error, the averages of the pixel values of odd-numbered rows and even-numbered rows will be substantially equal.

Figure 3:
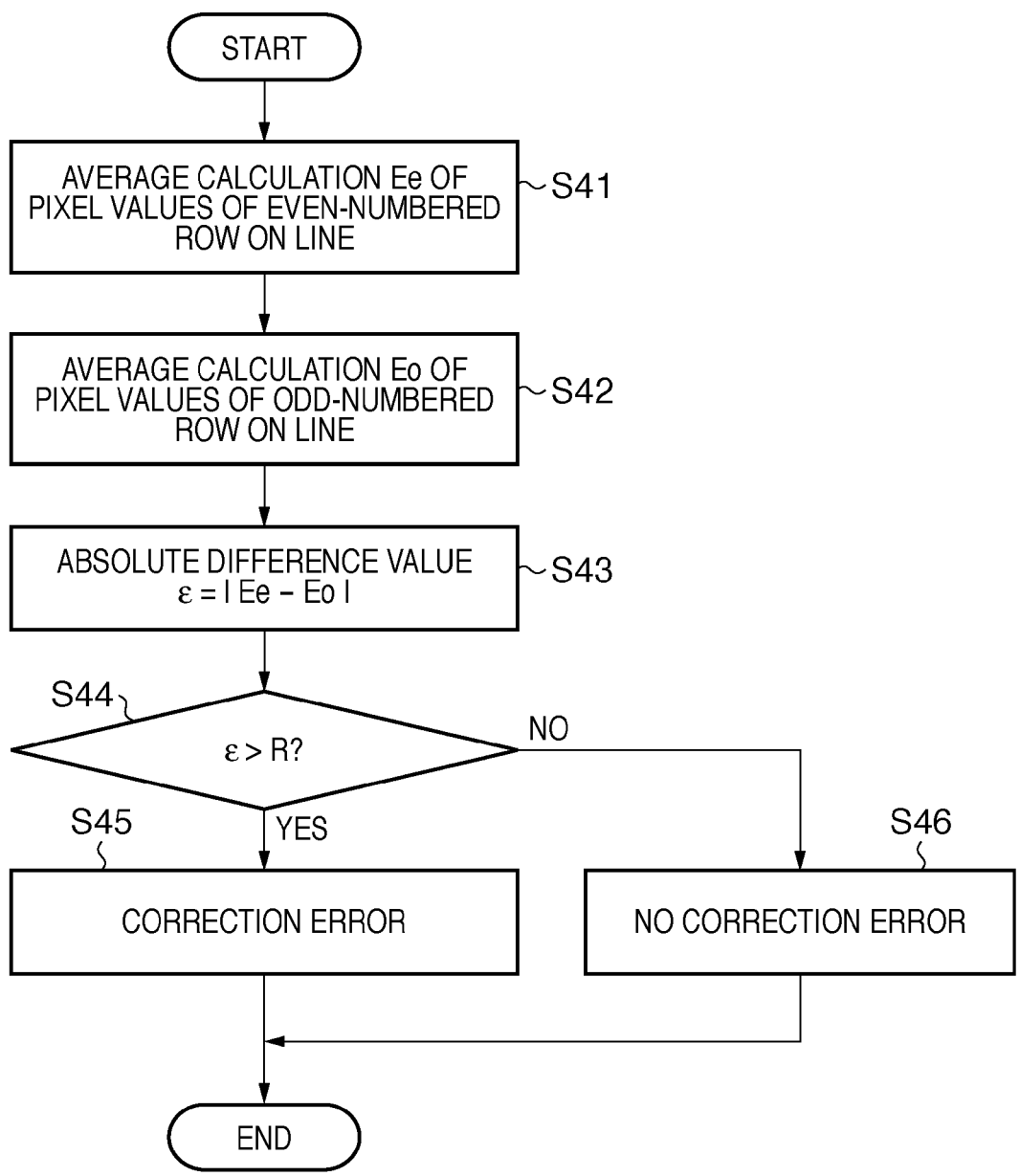
FIG. 3 is a flowchart showing an example correction result evaluation procedure.

FIG. 3 is a flowchart showing the procedure of correction result evaluation according to this technique. In FIG. 3, at S41, the pixel values of the even-numbered rows on the line are extracted and an average value (Ee) is calculated, and, at S42, an average value (Eo) of the pixel values of the odd-numbered rows is similarly calculated. At S43, the absolute value ($\epsilon$=|Ee−Eo|) of the difference of both average values is calculated, and, at S44, the calculated result thereof is compared with a defined value R. If greater than the defined value R, that is, if $\epsilon$>R (S44: YES), the processing proceeds to S45 and the result "correction error" is output. On the other hand, if not greater, that is, if $\epsilon$≤R (S44: NO), the processing proceeds to S46 and the result "no correction error" is output.

Also, as an alternative method, a one-dimensional difference filter that computes the difference between pixels adjacent in the row direction may be applied to the image, the power (sum of squares) of the image information obtained for the entire matrix may be evaluated, and if greater than a defined value, it may be evaluated that there is a correction error.

In the above embodiment, a configuration for providing the gains of the plurality of amplifiers that are used with a specific pattern and monitoring fluctuations in the characteristics of the amplifiers downstream was described. In another embodiment, a configuration for monitoring fluctuations in the characteristics of the image sensor rather than fluctuations in the characteristics of the amplifiers will be described.

Figure 4:
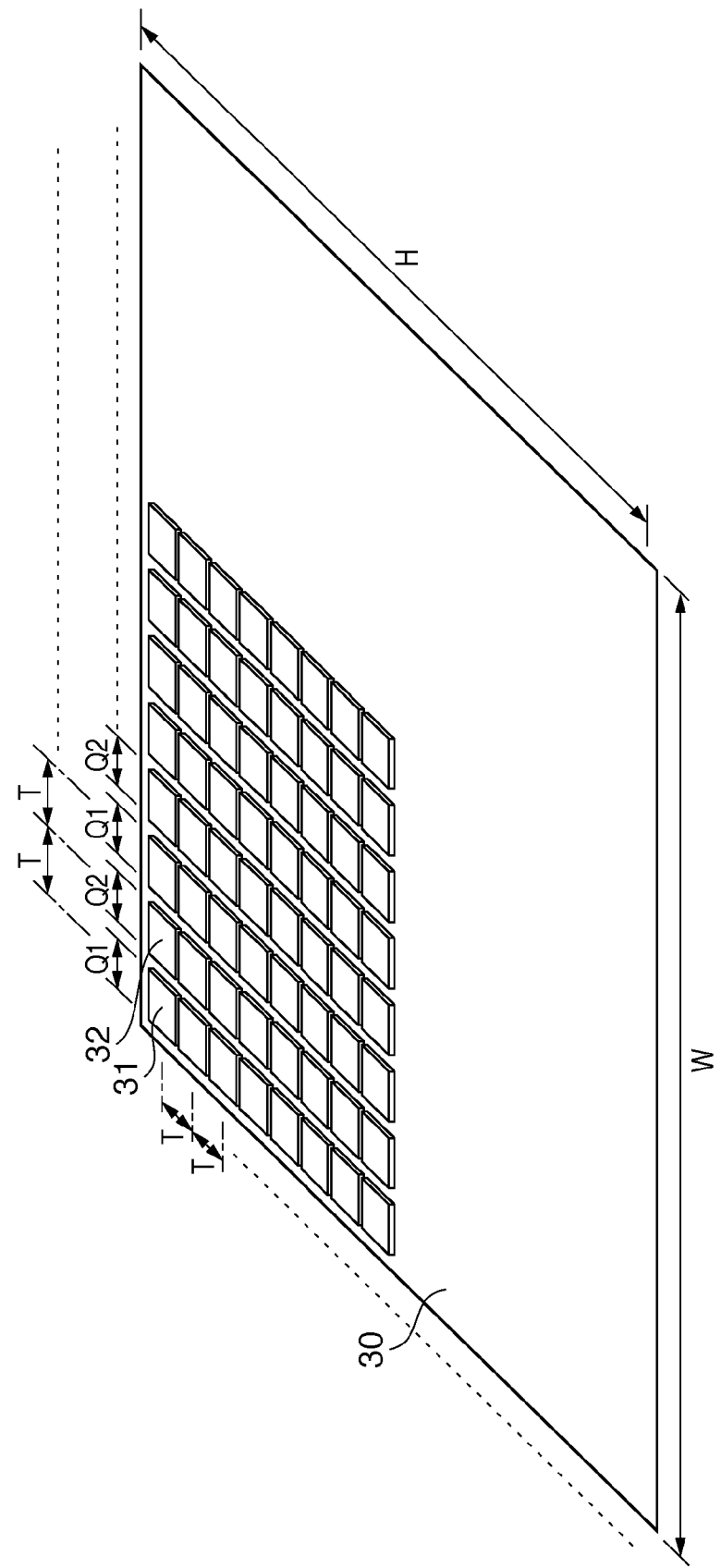
FIG. 4 shows an example configuration of an X-ray flat panel detector.

FIG. 4 schematically shows the surface of the image sensor, with the overall area being indicated by W×H, and reference numerals 31 and 32 representing the light-receiving portions of photodiodes in the pixels of the image sensor. The photodiodes are precisely aligned in a matrix on the image sensor at an interval T, with the photodiodes aligned in a column 31 having light-receiving portions of width Q1, and the photodiodes aligned in a column 32 having light-receiving portions of width Q2. In this case, Q1>Q2. This image sensor thus has a light sensitivity that differs in the column direction, with the gain coefficients for the X-rays differing.

In the present embodiment, a plurality of photoelectric converters each having first photoelectric conversion characteristics or second photoelectric conversion characteristics are thus disposed in accordance with a prescribed pattern. The correction result of the electrical signals output by these photoelectric converters is evaluated, and the presence of an error in the photoelectric conversion characteristics of the photoelectric converters is determined. For this reason, a similar effect to when the gain coefficients of even-numbered and odd-numbered rows are differentiated as in the aforementioned embodiment is obtained, and, if there is an error in the sensor characteristic correction, a pattern alternating between strong and weak intensity appears every pixel in the form of lines. Consequently, whether the correction is OK can be automatically judged by a correction result evaluation unit 22 that is similar to the aforementioned embodiment.

In the aforementioned embodiment, a configuration in which the operator performs recalibration according to the existence of a correction error was described. In still another embodiment, a configuration for automatically modifying the offset correction values that are held, so as to reduce the correction error will be described.

Figure 5:
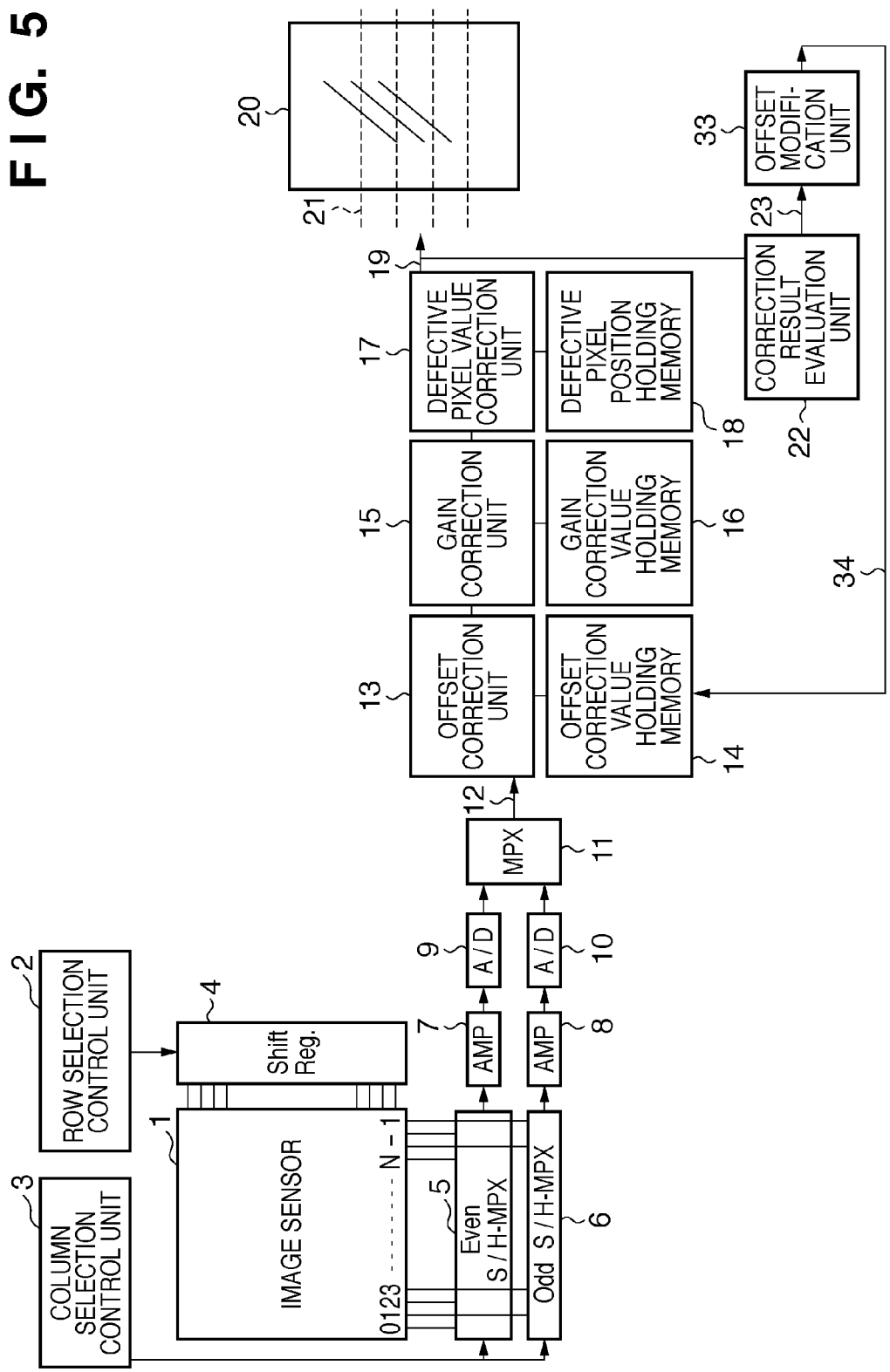
FIG. 5 is a block diagram showing an example configuration of an X-ray imaging apparatus.

FIG. 5 is a block diagram of an X-ray imaging apparatus according to the present embodiment. The same reference numerals are given to constituent elements that are similar to FIG. 1, and description thereof will be omitted. In FIG. 5, a block 33 is an offset modification unit. The offset modification unit 33 receives the output of the correction result evaluation unit 22, and, if the evaluation result is not OK, modifies the offset correction values and performs the correction process again to make the evaluation result OK.

In this case, in the correction result evaluation unit 22, correction can be optimized by repeatedly modifying the offset correction values such that the P value serving as an evaluation index that was described with reference to FIG. 2 is minimized, rather than judging whether the result is OK with an absolute evaluation criterion. Here, the P value is a ratio of the power spectrum for a prescribed pixel (for example, power spectrum of N/2th point (512th point)) to the power spectra of other portions.

Figure 6:
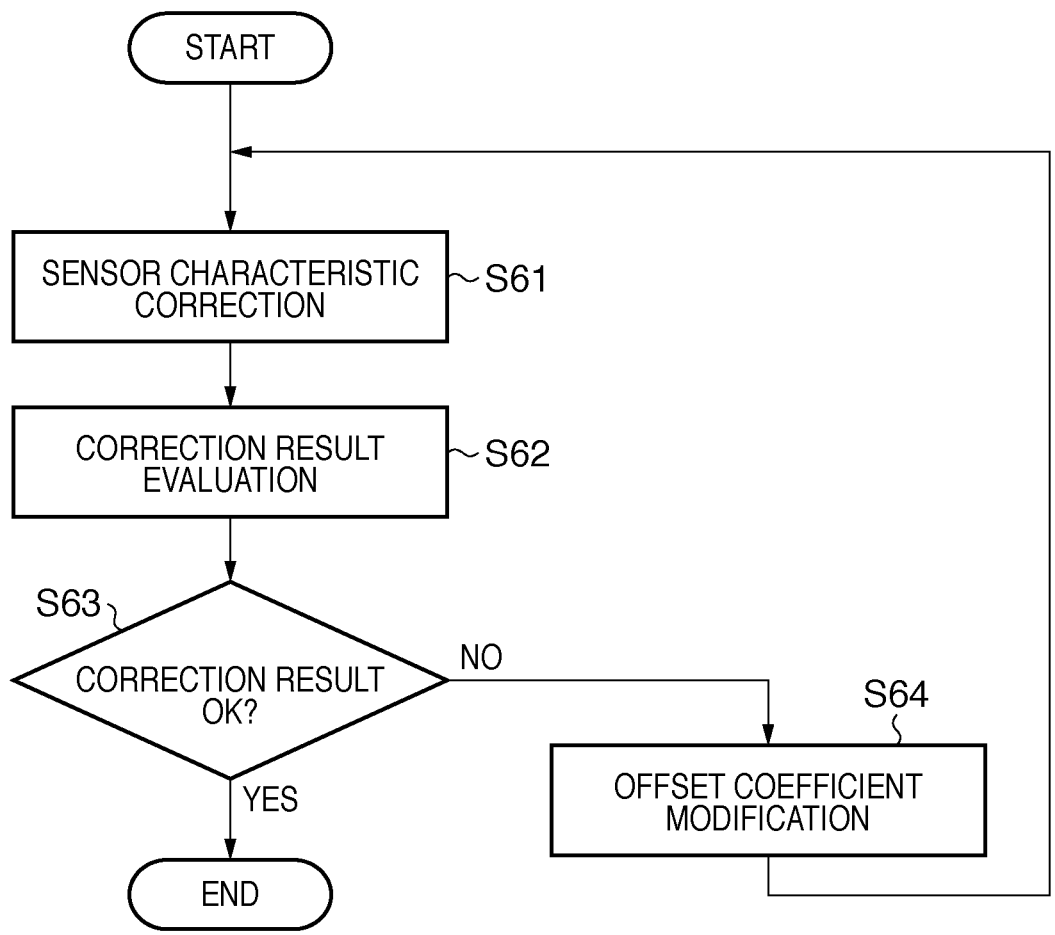
FIG. 6 is a flowchart showing an example offset correction procedure.

FIG. 6 is a flowchart showing a processing procedure for automatically modifying offset correction values based on the evaluation of correction results. The processing in FIG. 6 can be executed by a CPU (not shown) executing programs stored on a computer-readable recording medium such as a ROM or the like, for example.

In S61, input pixel values are corrected using correction values held in the offset correction value holding memory 14, the gain correction value holding memory 16 and the like. The aforementioned procedure can be applied as the specific procedure of the correction process. Next, in S62, it is evaluated whether the correction result is OK by analyzing the pixel values after correction. This evaluation procedure is as aforementioned. If the evaluation result at S63 indicates that correction is OK (S63: YES), the processing is ended. If correction is not OK (S63: NO), the offset coefficients are modified in S64 and processing returns to S61. Note that modification of the offset coefficients can be performed by adding or subtracting a prescribed value to or from the correction values, for example.

Thus, in the present embodiment, it is possible to appropriately maintain correction errors without the operator performing complex operations, since correction values held in advance are automatically modified, based on the evaluation of correction results.

Figure 7:
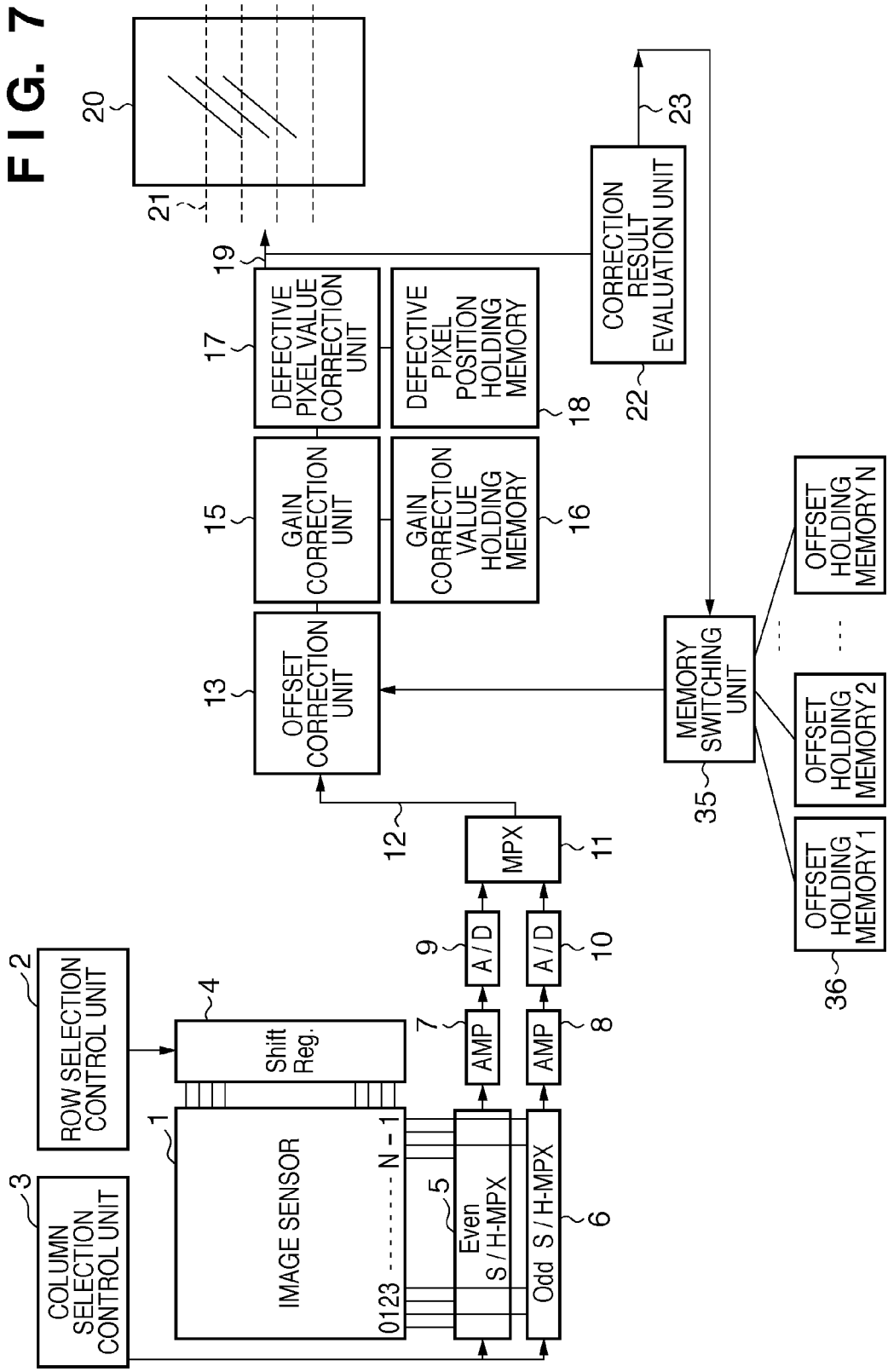
FIG. 7 is a block diagram showing an example configuration of an X-ray imaging apparatus.

In yet another embodiment, optimal correction is always performed, by switching offset correction values for a plurality of states held in advance, according to the output of the correction result evaluation unit, rather than modifying the offset correction values. FIG. 7 is a block diagram of an X-ray imaging apparatus according to the present embodiment. The same reference numerals are given to constituent elements that are similar to FIG. 1, and description thereof will be omitted.

In the present embodiment as shown in FIG. 7, a plurality of offset holding memories 36 that respectively hold offset correction values are provided. In FIG. 7, an offset correction value to be used by the offset correction unit 13 is selected, as a result of a memory switching unit 35 selecting a memory according to the output from the correction result evaluation unit 22, based on the offset correction values respectively held by the plurality of offset holding memories 36. Once the memory switching unit 35 has selected an offset correction value, the offset correction unit 13 automatically performs correction using this offset correction value.

Thus, in the present embodiment, correction errors can be appropriately maintained without requiring complex operations, since offset correction values held in advance are switched according to the output of the correction result evaluation unit.

In the aforementioned embodiments, examples in which the offset correction value fluctuates were described, but the presence of a correction error can also be determined by a similar technique in the case where a correction value other than the offset correction value, such as a gain correction value, fluctuates under the influence of temperature or the like. In the present embodiment, a technique for automatically determining the presence of a correction error in the case where a correction value other than the offset correction value fluctuates will be described.

The principle of this technique is as follows. Assume that the actual gain c and offset d at a given temperature T are known, and are respectively stored in advance in the memories 16 and 14 as the gain correction value C and the offset correction value D. At this time, C=c and D=d holds true. When the analog output value of the image sensor and the digital output value obtained from the image sensor 1 at temperature T are respectively given as V and Y:

$$Y = c \cdot V + d \quad (8)$$

Consequently, the analog output value V can be restored from the digital output value Y with the following equation, using the gain correction value C and the offset correction value D.

$$V = (Y - D)/C \quad (9)$$

Here, substituting (9) into (8):

$$V = (c \cdot V + d - D)/C \quad (10)$$
$$= (c/C) \cdot V + (d - D)/C$$

In (10), even supposing that the offset correction value D matches the offset d, such that (d−D)/C=0, (c/C) will also fluctuate when the gain correction value C fluctuates, and consequently the digital output value Y also fluctuates in accordance with the fluctuation pattern of the gain correction value C. Consequently, a correction error relating to the gain component can also be detected using the aforementioned technique, as a result of C fluctuating in accordance with a prescribed pattern that is not present in the information of the object. Also, the same applies in the case where both the offset component and the gain component fluctuate.

With the above configuration, the correction error pattern is a pattern that would not be possible in the original object and can be readily detected by computer analysis. For this reason, even if a correction error occurs, early detection is performed at a stage where the correction error is weak by constantly monitoring the corrected image, and the manifestation of a correction error is forestalled. In particular, in the present embodiment, use is made of the fact that the existing gain correction value remains in the case where the offset coefficient has fluctuated, and fluctuation in the offset coefficient is detected by intentionally providing the gain coefficient with a specific pattern, and detecting the appearance of this pattern in the output image. Consequently, a correction error in an X-ray flat panel detector can be detected early, enabling responses such as early recalibration by outputting a warning, modification of correction data and the like to be adopted, and stable X-ray image acquisition to always be performed.

According to the present invention, technology for automatically determining whether correction of conversion characteristics per pixel in an imaging system is necessary, without requiring manual observation, is provided.

Other Embodiments

Aspects of the present invention can also be realized by a computer of a system or apparatus (or devices such as a CPU or MPU) that reads out and executes a program recorded on a memory apparatus to perform the functions of the above-described embodiments, and by a method, the steps of which are performed by a computer of a system or apparatus by, for example, reading out and executing a program recorded on a memory apparatus to perform the functions of the above-described embodiments. For this purpose, the program is provided to the computer for example via a network or from a recording medium of various types serving as the memory apparatus (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-123535, filed on May 21, 2009, which is hereby incorporated by reference herein in its entirety.

What is claimed is:

1. An imaging apparatus comprising:
   a plurality of photoelectric converters each adapted to perform photoelectric conversion in response to receiving light, and output an electrical signal;
   a holding unit adapted to hold, for each of the plurality of photoelectric converters, gain correction values for correcting photoelectric conversion characteristics of the photoelectric converters;
   a correction unit adapted to correct each of the electrical signals output by the plurality of photoelectric converters, using corresponding gain correction values which have been increased or decreased in accordance with a prescribed pixel arrangement pattern; and
   an evaluation unit adapted to evaluate correction results that are based on the gain correction values.

2. The imaging apparatus according to claim 1,
   wherein the holding unit further holds offset correction values for correcting offset characteristics of the photoelectric conversion characteristics,
   wherein the gain correction values are correction values for correcting gain characteristics of the photoelectric conversion characteristics, and
   the correction unit corrects each of the electrical signals based on at least the gain correction values, which have been increased or decreased in accordance with the prescribed pattern, and the offset correction values.

3. The imaging apparatus according to claim 1 further comprising:
   a notification unit adapted to notify that there is a correction error, in a case where the evaluation unit determines that there is a correction error.

4. The imaging apparatus according to claim 1 further comprising:
   a modification unit adapted to modify the gain correction values held by the holding unit, based on the evaluation of the correction results by the evaluation unit.

5. The imaging apparatus according to claim 1,
   wherein the plurality of photoelectric converters are arranged in a matrix, and
   the prescribed pattern is configured by alternately increasing and decreasing the gain correction values for adjacent rows of the matrix.

6. The imaging apparatus according to claim 5,
   wherein the evaluation unit determines that there is a correction error, if a peak value of results obtained by performing a Fourier transform on the correction results in a row direction of the matrix is greater than or equal to a predetermined value.

7. The imaging apparatus according to claim 5,
   wherein the evaluation unit determines that there is a correction error, if a difference between an average value of the correction results of odd-numbered rows of the matrix and an average value of the correction results of even-numbered rows of the matrix is greater than or equal to a predetermined value.

8. The imaging apparatus according to claim 5 further comprising:
   a difference filter adapted to calculate a difference of the correction results of adjacent pixels in a row direction of the matrix,
   wherein the evaluation unit determines that there is a correction error, if a sum of squares of the differences over the entire matrix is greater than or equal to a predetermined value.

9. An imaging apparatus comprising:
   a plurality of photoelectric converters each adapted to perform photoelectric conversion in response to receiving light, and output an electrical signal;
   a holding unit adapted to hold, for the plurality of photoelectric converters, correction values for correcting photoelectric conversion characteristics of the photoelectric converters;
   a correction unit adapted to correct each of the electrical signals output by the plurality of photoelectric converters, using corresponding gain correction values which have been increased or decreased in accordance with a prescribed pixel arrangement pattern,
   wherein the photoelectric converters each have first photoelectric conversion characteristics or second photoelectric conversion characteristics, and are arranged in accordance with a prescribed pattern; and an evaluation unit adapted to evaluate a correction result of the electrical signals output by the photoelectric converters.

10. A control method of an imaging apparatus that includes a plurality of photoelectric converters each adapted to perform photoelectric conversion in response to receiving light, and output an electrical signal, and a holding unit adapted to hold, for of the plurality of photoelectric converters, a gain correction value for correcting photoelectric conversion characteristics of the photoelectric converters, comprising:
- a correction step of correcting each of the electrical signals output by the plurality of photoelectric converters, using corresponding gain correction values which have been increased or decreased in accordance with a prescribed pixel arrangement pattern; and
- an evaluation step of evaluating correction results that are based on the gain correction values.

11. A non-transitory computer-readable medium storing a computer program, the computer program causing an imaging apparatus that includes a plurality of photoelectric converters each adapted to perform photoelectric conversion in response to receiving light, and output an electrical signal, and a holding unit adapted to hold, for the plurality of photoelectric converters, gain correction values for correcting photoelectric conversion characteristics of the photoelectric converters to execute:
- correcting each of the electrical signals output by the plurality of photoelectric converters, using gain correction values which have been increased or decreased in accordance with a prescribed pixel arrangement pattern, and
- evaluating correction results that are based on the gain correction values.

* * * * *